March 25, 1952  P. J. CARPENTIER  2,590,156
METHOD OF MAKING CELLULAR THERMOPLASTIC MATERIALS
Filed Feb. 27, 1948  4 Sheets-Sheet 1
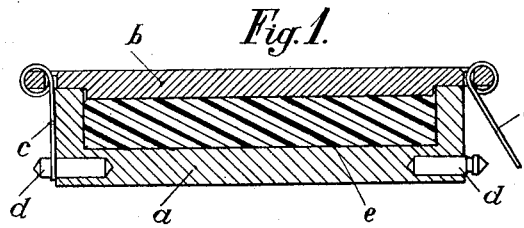
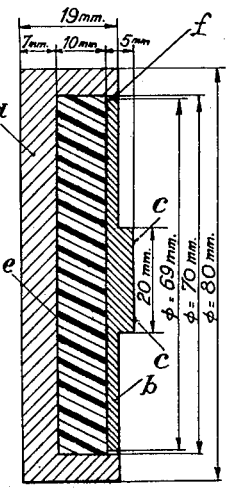
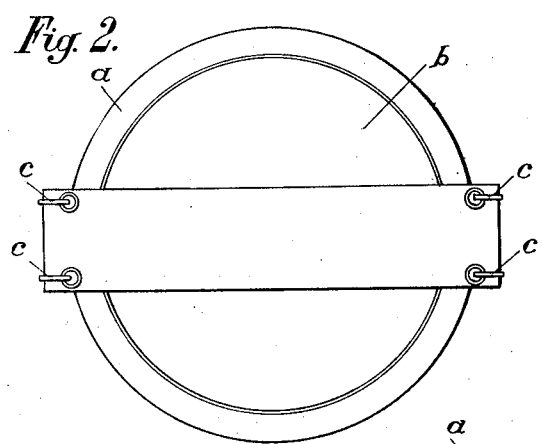
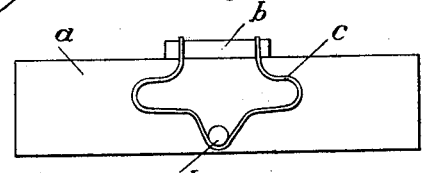
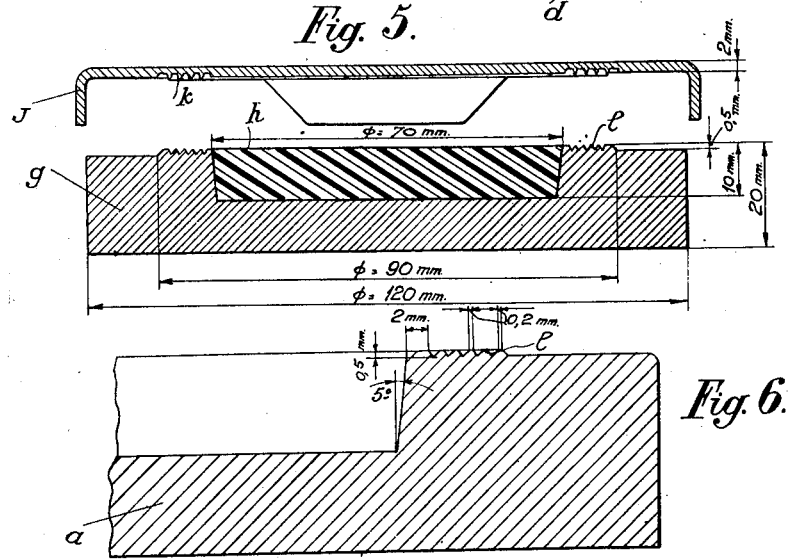
INVENTOR:
Pascal J. Carpentier
By: *John H. Graham*
His Agent March 25, 1952  P. J. CARPENTIER  2,590,156
METHOD OF MAKING CELLULAR THERMOPLASTIC MATERIALS
Filed Feb. 27, 1948  4 Sheets-Sheet 2
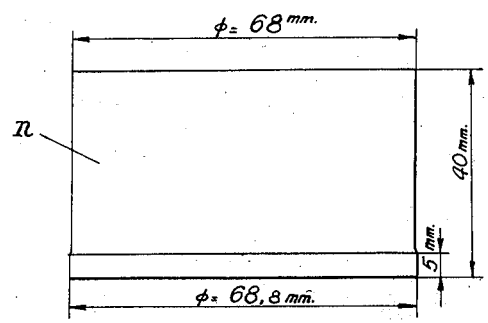
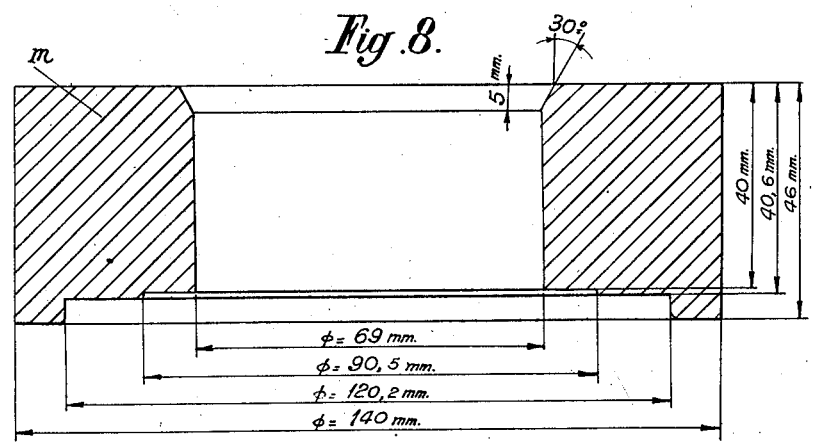
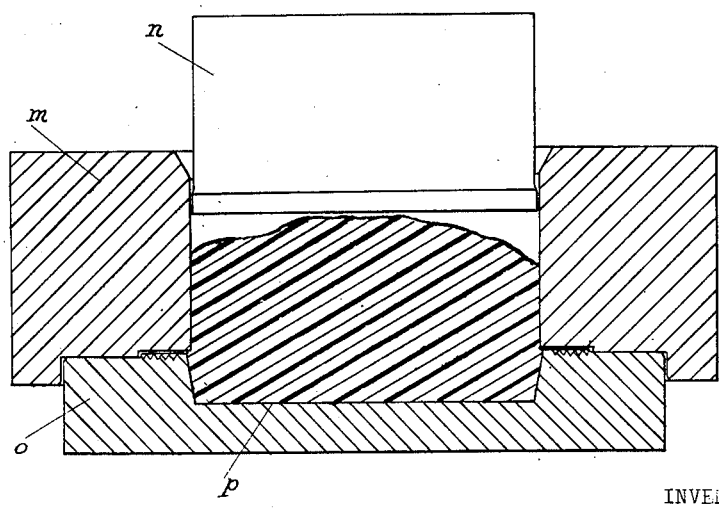
INVENTOR:
Pascal J. Carpentier
BY: John H Graham
His Agent

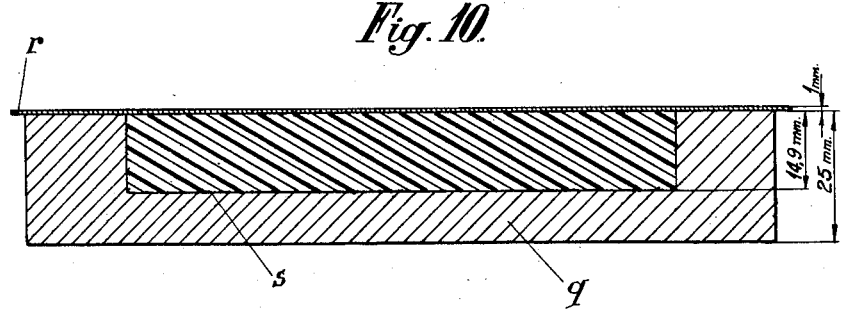
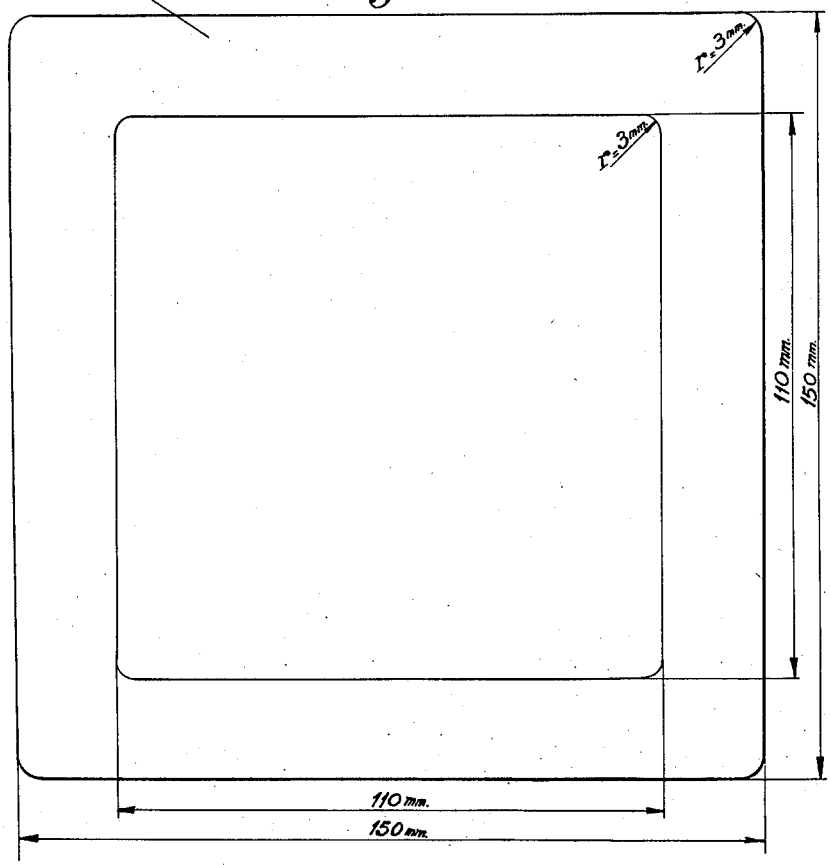

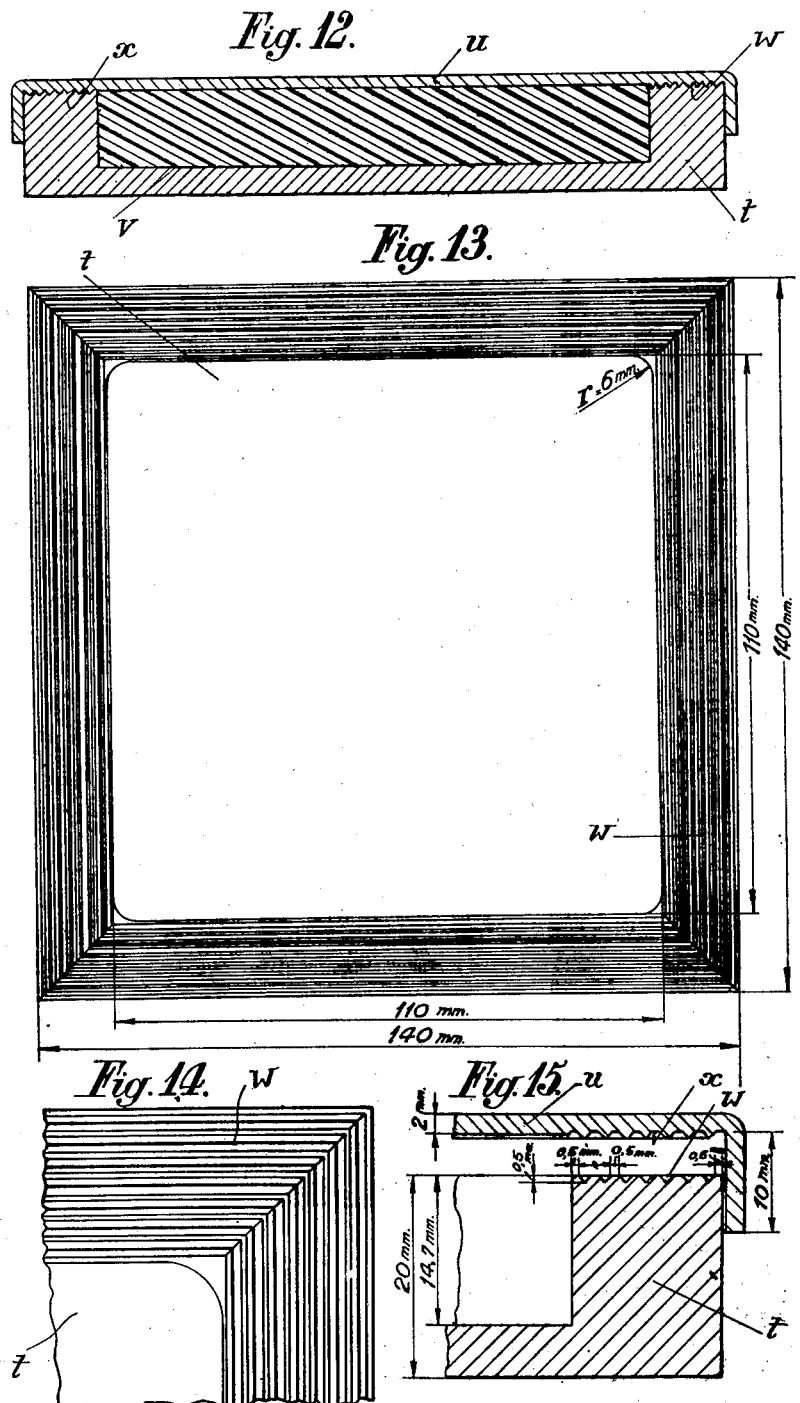

Patented Mar. 25, 1952

2,590,156

UNITED STATES PATENT OFFICE 2,590,156

METHOD OF MAKING CELLULAR THERMOPLASTIC MATERIALS

Pascal J. Carpentier, Paris, France

Application February 27, 1948, Serial No. 11,813
In France February 18, 1947

7 Claims. (Cl. 18—48)

The present invention relates to methods of making cellular thermoplastic materials and is more specifically concerned with the production of light weight and stable products made of thermoplastic material having a specific cellular structure.

Generally, it is the object of the present invention to provide a new and useful method of producing cellular thermoplastic substances having an improved cellular structure composed at least in part of closed polyhedral cells.

More particularly, the present invention contemplates the production of a new and useful cellular thermoplastic material which will have many uses in industry and which is superior in quality and performance to existing cellular materials.

With a view to obtain low density materials from thermoplastic substances, bodies have been already produced having a cellular structure composed of open or closed cells of various regular and irregular shapes and in particular of closed globular cells throughout or mixed with other types of cells.

I have found that in order to secure maximum structural resistance in a given cellular material of a certain density, a superior structure is the one composed of closed polyhedral cells. In such a structure the partition separating two adjacent cells can be plane or curved, but in each instance the partition is of substantially uniform thickness throughout, whereas, on the contrary, in a structure composed of globular cells, the partition separating two adjacent cells is the thinnest at the point where the two cells are nearly tangent, its thickness increasing in progression with the distance from that particular point. Obviously the resistance of such partition or partitions to external forces is determined by the thinnest or weakest spot and the increased thickness of the partition elsewhere adds only to the weight of the structure without materially increasing its resistance or supplying any other advantage.

This however is contrary to one of the principal advantages of cellular bodies which is to have the lowest possible weight for a given purpose. This principle is obviously better achieved by cellular bodies having a structure composed of closed polyhedral cells.

In practising the present invention I have employed as a base material various thermoplastic linear-high-polymer substances such as the vinyl polymers, as for instance polyvinyl chloride and polyvinyl acetal, and such as polystyrene, each alone or in combination with each other and I have also combined with them compounded or uncompounded rubber and rubberlike substances.

As a first operation or step in the method, in order to supply the base material or materials with properties desirable in the ultimate product and/or for the execution of the operations described below, and in accordance with practices well known in the art of plastic industries, I have pretreated the base material or materials, adding if necessary or advantageous such ingredients as plasticizers, stabilizers, dyestuffs and other auxiliary materials, and homogeneously mixing all of them preferably on a mill or in a mixer. The homogeneous product resulting of this operation No. 1 will hereafter be referred to as the "Mass," even should this mass in the course of later operations undergo changes in its composition or otherwise.

As a second operation or step in well known manner I have formed out of the mass an object in the shape of the desired ultimate product, however in reduced size and volume, taking care to avoid airfilled spaces within the mass, and this particular preformed mass will hereafter be referred to as the "miniature model." The relation between the volume of the miniature model and the volume of the ultimate product is inverse proportional to the relation between the density of the miniature model and the density of the ultimate product.

As a third step or operation 3, as hereinafter described, I have, homogeneously distributed into, and, under the influence of high pressure, temporarily dissolved in the mass of the miniature model a gas or mixture of gases which is chemically inert with regard to the particular mass employed, and which diffuses only slowly through it, for example, nitrogen. I have arranged that the miniature model be simultaneously heated to such a temperature as to initiate the gelatinization of its particular mass, which temperature is well known in the art for the various materials. This third step or treatment is carried out in a pressure resisting vessel. As such a vessel I have for instance employed an autoclave into which I have placed the miniature model enclosed in a mould of a type described hereinafter. Another type of pressurized vessel I have employed is a mould placed with a suitable cover between the platens of a hydraulic press which applies pressure onto the mould and its cover. In this case the mould, as hereinafter described, contains the miniature body within a chamber of substantially its size and shape. In order to raise the temperature of the miniature model to the required degree, I have heated the autoclave or the platens of the press or I have applied other ways of heating such as high frequency or electronic heating methods.

As a fourth operation or step, I have simultaneously with or immediately after the third step carried out another combined operation as follows: I have arranged that the high pressure exercized on the miniature body in the course of step 3 be swiftly reduced to a level at which the mass releases some of the gas dissolved during the third step, and I have thereby released gas, and preferably all the gas previously dissolved in the mass, and I have concurrently arranged for a controlled expansion of the system comprising the mass and this released gas enclosed within the mass, to the order of about 15% of its previously volume, for example, thereby causing a dislocation and flow of all particles of the mass. The above controlled and limited expansion permits every particle of said gas to occupy a proportional space within said system. Under correct conditions of temperature and pressure, I have found that a closed polyhedral cell structure can be obtained.

Such conditions include on the one hand the remaining pressure, which is substantially identical to the pressure exercised by each gas particle on its surroundings in general and on the adjacent gas particles in particular, and on the other hand, the influence of the consistency of the mass itself which consistency is mainly formed of the membranes separating the gas particles and opposes the flowing together of the mass into a more or less solid body while preventing the gas particles from combining into a larger gas bubble. Thereafter the mass contains gas enclosed in closed polyhedral cells and is obviously for this reason of lower density than was the miniature model. This rudiment cellular material will hereafter be known as the "cellular embryo." During all this fourth step I have continued heating the mass and finally up to a temperature and for a time sufficient to complete the gelatinization and the curing of the particular mass employed, as is usual with general practice known in the art.

As a fifth step or operation, I first cooled down the material and then reduced the pressure to atmospheric.

As a sixth step or operation, I removed the embryo, which operation eventually includes demoulding and this, if it is desirable, by application of heat or cold as an auxiliary measure. The embryo, if not confined and under atmospheric pressure, will expand somewhat under the influence of the gas enclosed which is under pressure, and, after this expansion has come to a standstill, the expanded body will be called the "initial body."

As a seventh step or operation, after allowing a period of time say up to 24 hours for relaxing, I heat this initial body quickly, thoroughly and uniformly, normally at atmospheric pressure, and preferably in a drastically agitated medium of gas or liquid, in order to carry it quickly to a temperature at which the particular mass employed becomes plastic and ductile so that the enclosed gas, the pressure of which is increased simultaneously on account of the raised temperature, expands, thereby obviously expanding the whole body. Preferably, I maintain the above-mentioned temperature even after the expansion has come to an end for some minutes in order to allow all internal tensions to compensate, anneal and settle.

As an eighth step or operation, I cool the mass down to normal or even lower and, after some time allowed for relaxing, I obtain after removing all extrusions or protrusions etc., which might have made their appearance in the course of the operations, what will be called the "ultimate product" composed of closed polyhedral cells. This product is to all practical purposes an enlarged replica of the miniature model, the volumes of the two comparing in inverse proportion to their densities.

As mentioned above, the types of pressurized vessel most suitable for industrial production are the autoclave and the mould with cover under pressure in a hydraulic press. Also other equipment can be specially adapted such as extruders.

The autoclave used for practicing the present invention should have arrangements for heating and cooling and also allow the building up of pressure of the order of 600 kg./cm.$^2$ and the quick reduction of such pressure by a predetermined percentage, by for instance equipping it with a number of pressurized antechambers of different volume into which part of the contents of the autoclave can at will be quickly released.

The hydraulic press used for practicing this invention is provided with platens which can be heated and cooled. Heating and cooling arrangements may also be arranged in or around the mould.

When using the hydraulic press for the present invention the mould must be sufficiently strong to be able to take over the additional function of resisting the processing pressure whereas this is not the case if an autoclave is employed.

By way of example, there is described hereinafter an embodiment of the process according to the invention with reference to the accompanying drawings which form part of this specification.

Of the drawings:

Figure 1 is a cross-sectional elevation of a mould for use in practicing the present invention when employing an autoclave;

Figure 2 is a plan view of the mould of Fig. 1;

Figure 3 is a side elevation of the mould of Fig. 1;

Figure 4 is another cross-sectional elevation of the mould of Fig. 1 taken at an angle of 90° in relation to the cross-section of Fig. 1;

Figure 5 is a cross-sectional elevation of a mould according to the present invention when employing a hydraulic press;

Figure 6 is an enlarged view of part of the mould of Fig. 5;

Figures 7 and 8 show a mould filler for use in practicing this invention;

Figure 9 is a cross section showing the mould filler of Figs. 7 and 8 in active association with a mould;

Figure 10 is a cross-sectional elevation of a square mould according to the present invention;

Figure 11 is a plan view of the mould of Fig. 10;

Figure 12 is a cross-sectional elevation of another form of square mould;

Figure 13 is a plan view of the mould of Fig. 12 with the cover removed;

Figure 14 is an enlarged detailed view of the plan view of Fig. 13, and

Figure 15 is another enlarged detailed view in elevational cross section of the mould of Fig. 12.

Referring to Figs. 1–4, $a$ is the body of the steel mould which receives the miniature model $e$, $b$ is a steel cover provided with two hinged steel spring clips $c$ fastened to two studs $d$. The mould is not gas tight as, between body and cover, a slit $f$ is arranged permitting the entry of gas. The spring action of clips $c$ allows for the expansion of the mass enclosed in the mould, but in the case of an abrupt increase of the volume they prevent the bulk of the mass from being projected out of the mould and sprayed about the autoclave. However, some of the mass may leave the mould during the process.

Generally speaking, in applying my method, the proper processing of the mass remaining in the mould into the ultimate cellular product, is in no way affected if a certain portion of the mass leaves the mould, as is quite normal during the operation of controlled expansion as described hereinbefore.

Of course, the general principle of a mould for an autoclave as outlined above can be varied and adapted to different practical conditions. In the production of sheets for instance, the principle of this mould can be applied by winding a sheet, made out of the mass and which in this case represents the miniature model, spirally on a cylindrical spool with side panels, at the same time winding between the layers of this sheet, in the way of separations, sheets of other material such as paper, metal, etc. When ready wound the complete structure is fastened rigidly or elastically by means of clamps, belts etc. The gas can penetrate into the mass because the layers do not fit gas tight to the side panels of the spool. To enable the expansion of the mass, the width of the layers of the mass is less than the distance between the side panels by an amount calculated to allow for said increase of the volume. Also the layers may be elastically fastened in such a way that, under the influence of the expanding forces reduced by the friction between the layers, they can turn around the spool, by this action unwinding themselves and thereby increasing their volume to a certain calculated extent.

Referring now to Figs. 5 and 6, $g$ is the body of a round steel mould which receives the miniture model $h$, and which has concentric grooves on its top face, $j$ is a square sheet of soft aluminum, the four points of which have been bent down at right angles in such a way as to allow the cover to fit snugly over the external surface of the mould. This cover has grooves $k$ matching with mould grooves $l$ and obtained for instance by pressing of the cover onto the mould previous to its filling, thus forming a gas tight joint during operations 4 and 5. The gas tight joint can of course be achieved by other means, as by a solidly constructed steel cover which covers the top as well as the sides of the mould body, fitting the sides very tightly. The top of the mould body will in this case be ungrooved.

The gas under high pressure developed during operation 3 will provide for the expansion of the mass, which will go on until the remaining pressure within the mold is counterbalanced by the force of the press.

If, in the course of this expansion, some of the mass leaves the mold, this, however, does not interfere, as explained above, with the proper processing of the mass remaining in the mold.

The moulds may be employed to carry out in their compartment the operation two of conveying to the mass the shape and dimensions of the miniature model, for example, by pressing the mass into it. In other cases it is practicable to do all or part of this operation outside the mould as by rolling sheets on mills, or by punching slabs out of a plate of the mass which then are placed into a mould.

It is obvious that innumerable shapes and sizes can be produced by these methods.

For the distributing of the gas in the mass as per operation 3, I employ one, or both simultaneously of two distinct procedures. I either impregnate the mass with the gas by enforcing gas into it from the exterior under high pressure, or else create the gas within the mass itself.

The autoclave process lends readily to both procedures. In the event that the gas is impregnated into the mass from its exterior this gas can obviously either be generated elsewhere and then be pumped and compressed into the autoclave, or else it can be created within the autoclave by an agent which generates the gas under certain conditions, as for instance at a certain temperature, and both procedures may be employed simultaneously. I have found that the gas is reliably distributed and dissolved in the mass when contact is arranged at sufficiently high temperature and pressure for sufficient time. These three factors can by normal means be established for any suitable base material or materials and any suitable combination or composition thereof and therewith by means of a few trial runs. Concurrently and/or simultaneously a gas evolving agent may be incorporated within the mass.

This latter procedure is preferable whenever a mould in an hydraulic press is employed, and this procedure has in every case the advantage of assuring the homogeneous distribution of the gas throughout the mass in as much as this agent as well as the other ingredients composing the mass have been homogeneously mixed with each other. In the event that the gas generating agent releases said gas as soon as a certain temperature has been attained, this temperature must be arranged to be in accordance with operating conditions as outlined before. This may be done either by selecting an appropriate agent or combination of agents or otherwise by adjusting the properties of the mass to the critical temperature of the agent employed by selection of an appropriate base material, by adding plasticizers, stabilizers and other auxiliary materials in suitable proportions.

When selecting the gas evolving agent to be employed within the mass, the following points must be considered; it should be soluble in the base material or other components of the mass; neither the agent itself nor its residues must react with the other materials or otherwise interfere with the procedure in general in a detrimental manner, for instance it must not develop water in any appreciable quantities. When employed within the mass such agent must be a true blowing agent i. e. it must, at a given moment, evolve the gas in an abrupt manner, similar to an explosion and this must take place at or about the temperature at which the gelatinization of the mass is initiated and it can in this event be this very blowing up of the agent which creates the high pressure required in the third operation hereinbefore set forth, in order to dissolve gas in the mass.

In any case the gas generated must have a low speed of diffusion through the particular mass employed in order to ensure the expansion of the mass before the gas has had time to diffuse out of the mass in sufficient quantities as to endanger the expansion desired.

With regard to the materials composing the mass it is generally essential that they be pure, and stable up to 200° C., that they should be either liquid or solid, at the temperature employed in operation 7, and that, if they are in operation 1 mixed into the mass in solid state, they be micro-pulverized.

By the method as detailed above, a great variety of cellular ultimate products has been produced, different in specific gravity which may be as low as about 0.020 and which is not the limit, and also very different in mechanical properties ranging for instance from soft to hard, from elastic to brittle, different in colors, shapes, sizes, in sizes of cells, and which can be cut, sliced, drilled, or otherwise machined, laminated, or worked on.

With regard to the density of the ultimate product, this will be decided mainly by the density of the mass, the quantity of gas generating agent therein contained, the quantity of gas distributed and dissolved within the mass, the resistance offered by the mass to expansion as well as of course the particular operating conditions applied such as for instance the rapidity of heating the mass, as well as the temperatures and the pressures applied.

With regard to the general properties of the ultimate product, it is common knowledge in the plastic industries that it is the nature of the base material or materials employed and eventually in combination with compounded rubber or rubber like materials which is of paramount importance as well as the modifications of properties conferred to the mass by incorporating plasticizers, stabilizers, and other auxiliary materials and also the pre-treatment accorded to these materials and to the mass in the way of mixing, milling, etc., and of course also the details of the operations as above. As an example, it is obvious that a certain given mass requires certain temperatures for initiating the gelatinization, for curing, for creating the ductility necessary for the operations explained before and this in turn determines the pressures to be applied for the various operations in order to produce the phenomena desired as well as the time required for the execution of said operations, as all these factors are interlocked and in relation to each other. By changing and adjusting the composition of the mass in the ways known in the art, its properties can within vast limits be made to suit otherwise desirable operating temperatures and pressures or to confer to the ultimate product certain desirable properties. For instance in operation 4 the operating temperature and pressure must be such that the mass becomes insolvent for the gas. On the other hand, the mass must be mixed in such manner that the viscosity at the same pressure and temperature is such as to allow the mass to flow and at the same time its consistency must be such as to ensure the continuity of the mass skeleton i. e. to prevent the neighboring cells having reached a certain volume from piercing the separating membrane between themselves and thus preventing the gas from re-uniting in bigger gas bubbles. Thus, I have discovered that by minor changes in temperature and pressure applied in operation 4 in the order of 5–10° C. and 5–10 kg./cm$^2$ it is possible to influence the size of the cells in the ultimate product, or create variations such as larger cells in the interior and smaller cells towards the exterior which is of special advantage for certain practical applications.

The following examples will supplement the explanations given above and on the basis of all the information combined, it will be possible for those skilled in the art to repeat the method and by means of some trial runs, to adjust the factors to apply the principle to any suitable base material.

*Example 1*

25 grs. polyvinylchloride type Rhodopas XH, supplied by Etablissements Rhone-Poulenc 21, rue Jean Goujon, Paris, 6.5 grs. azo isobutyric dinitrile, and 17 grs. tricresylphosphate are, on a mixing mill or in a mixer, homogeneously mixed and the total is placed into the mould as shown in Figs. 1 to 4 in such a way as to practically avoid entrapping air within the mass and the mould. The mould is placed into an autoclave. In the autoclave the air is replaced by nitrogen, compressed to a pressure of 500 kg./cm.$^2$. The autoclave is heated so as to carry the temperature of the contents of the mould to 115° always keeping the pressure fixed at 500 kg./cm.$^2$. After 20 minutes the pressure is reduced abruptly to 300 kg./cm.$^2$ heating continues so as to bring the temperature of the contents of the mould to 175° C. within 10 minutes and, always keeping the pressure of 300 kg./cm.$^2$ constant, heat continues at this temperature for 10 minutes. Thereafter the temperature of the contents is cooled down to 20° C., pressure being kept constant at 300 kg./cm.$^2$, after which the pressure is gradually reduced to atmospheric while the temperature of 20° C. is kept constant. The contents of the mould are demoulded, cut and cleaned to shape and heated in a medium of drastically agitated air so as to be carried uniformly and thoroughly to a temperature of 110° C. within 10 minutes which temperature is sustained for another 10 minutes all at atmospheric pressure. Thereafter the product is allowed to cool and relax at atmospheric pressure for 24 hours.

*Example 2*

70 parts per weight polyvinyl formal type Rhovinal F, approximate average molecular weight 35,000 (thirty five thousand), 15 parts per weight azo isobutyric dinitrile, and 30 parts per weight tricresylphosphate are homogeneously mixed on a friction mixing mill and thereafter rolled out on a rolling mill four times with the rollers in their closest position. 49 grams of the leaflike result are, by means of the filler of Figs. 7, 8, 9, pressed into a mould like the mould of Figs. 5 and 6, under a pressure of 14 metric tons.

In Figs. 7, 8, 9, *m* is a cylinder into which said 49 grams are filled. *n* is a piston by means of which, under the application of said pressure, the 49 grams are compressed into the mould *o* on top of which the filler *m*, *n* has beforehand been placed; *p* signifies said 49 grams of material. The mould now is to be covered with a cover as shown in Fig. 5 at *j*, which previously has been pressed into the empty mould so as to impress the grooves of the mould top into the cover. When placing the cover on the mould, the grooves thus created in the cover will be aligned with the grooves of the mould top. The press is closed and a pressure of 28 metric tons is applied to the mould and its cover. The press platens thereafter are heated so as to carry the contents of the mould to a temperature of 140° C. within 5 to 6 minutes, whereafter this temperature is maintained up to a total heating time of 20 minutes. Thereafter it is cooled down until the mould has a temperature of 30 to 40° C. The press and mould are then opened, the contents of the mould are demoulded and allowed to relax for 24 hours. Thereafter they are heated at atmospheric pressure in an oven, the air within which is well agitated and which air has a temperature of 109° C. for 13 minutes, after which the product is allowed to cool down and relax at room temperature of about 20° C.

*Example 3*

100 parts per weight polyvinyl acetyl resin type Rhovinal A; approximate average molecular weight 42,000 (forty-two thousand) and 20 parts per weight diazoaminobenzene both extremely finely pulverized are homogeneously mixed and three times rolled as explained in Example 2. The leaflike resulting product is extremely finely pulverized, and 49 grams of same are pressed into a mould like the mould of Figs. 5 and 6, as explained in Example 2 under a pressure of 85 metric tons. The mould is covered and treated in a press as explained in Example 2 but with a pressure of 35 metric tons and a temperature of 170° C. reached in 10 minutes and maintained for another 5 minutes and with cooling to 20 to 25° C. After opening of the press the mould is placed on a plate steam heated to 110° C., which gradually heats the mould and its contents until the contents of the mould commence to expand whereafter these contents can be demoulded by the application of a simple tool like a screw driver to force it out of the mould. After 24 hours of relaxing, the product is heated in an oven, as explained in Example 2, at 90° C. at atmospheric pressure for 15 minutes after which it is allowed to cool and relax for 24 hours.

*Example 4*

18 grs. polyvinylchloride type Rhodopas XH, supplied by Etablissements Rhone-Poulenc, 21, rue Jean Goujon, Paris, 8 grs. azo isobutyric dinitrile both extremely finely pulverized, and 22 grams tricresylphosphate are, on a mixing mill or in a mixer, homogeneously mixed and the total is placed in the mould of Figs. 5 and 6, in such a way as to practically avoid air being enclosed within the mass and the mould. The mould is covered by its cover made of aluminum and placed between the platens of a hydraulic press. A pressure of 25 tons is applied to the mould and cover. Heat is applied such as to carry the temperature of the contents of the mould to 180° C. within 10 minutes, which temperature thereafter is maintained for another 10 minutes. Thereafter the contents are cooled down to 20° C. Heating and cooling are effected by heating and cooling the platens of the press in suitable manner. The press is opened as well as the mould and its contents demoulded, cleaned and allowed to relax for 24 hours. Then the product is heated in an oven, as explained in Example 2, at a temperature of 115° C. for 20 minutes at atmospheric pressure, and thereafter allowed to cool down and relax for 24 hours at atmospheric pressure.

*Example 5*

25 parts per weight polyvinylchloride type Rhodopas X, 25 parts per weight polyvinylchloride type Rhodopas XH, 10 parts per weight nitro urea, all three extremely finely pulverized and 50 parts per weight tricresylphosphate are mixed on a friction mixing mill into a homogeneous paste, 50 grams of which are filled into the mould of Figs. 5 and 6, so as to practically avoid air being enclosed within the mass and the mould. The mould is covered as explained in Example 2 and subjected to a pressure of 23 metric tons at a temperature of 175° C. which is reached within 10 minutes and is maintained for another 5 minutes. The mould is cooled to a mould temperature of 25° C., the contents are demoulded and heated in an oven at 110° C. for 15 minutes and allowed to cool and relax for 24 hours, all as explained in Example 2.

*Example 6*

100 parts per weight polyvinyl acetal resin, type Rhovinal A, approximate average molecular weight 42,000 (forty-two thousand) and 15 parts per weight azo isobutyric dinitrile, both extremely finely pulverized, are treated and processed as explained in Example 3 with the following deviations: three times rolled 42 grams pressed into mould under pressure of 52 metric tons, treated in press with 42 metric tons, at a temperature of 180° C., and heated in an oven at 93° C. for 15 minutes.

*Example 7*

100 parts per weight polyvinyl formal resin, type Rhovinal F, approximate average molecular weight 35,000 (thirty-five thousand) and 15 parts per weight azo isobutyril dinitrile both extremely finely pulverized, are treated and processed as explained in Example 3 with following deviations: three times rolled, 46 grams pressed into mould at 52 metric tons, treated in press under pressure of 35 metric tons and at 180° C., cooled to 40 to 45° C., treated in oven at 113° C. for 20 minutes.

*Example 8*

115 parts per weight polyvinyl formal resin, type Rhovinal F, approximate average molecular weight 35,000 (thirty-five thousand) 35 parts per weight plasticizer elastol supplied by Etablissements Rhone-Poulenc, 21, rue Jean Goujon, Paris, and 22.5 parts per weight azo isobutyric dinitrile all three extremely finely pulverized are treated as explained in Example 2 with the following deviations: 46 grams are compressed into the mould at a pressure of 20 metric tons, treated in press under pressure of 35 metric tons at 180° C., cooled to 25 to 30° C., treated in oven at 94° C. for 15 minutes.

*Example 9*

58 parts per weight polyvinylchloride, type Afcovyl C 12, approximate average molecular weight 75,000 (seventy-five thousand) 20 parts per weight azo isobutyric dinitrile both extremely finely pulverized, 42 parts per weight tricresylphosphate and 0.5 part per weight alphaphenylindole are mixed homogeneously in a mixer after which sheets are drawn on a friction mill. Out of these sheets, slabs, having the internal dimensions of the square mould as per Figs. 10 and 11 are cut out or punched. In Figures 10 and 11, $q$ is the body of the steel mould, the top of it being level, $r$ is a piece of polished steel sheet, $s$ is the contents of the mould (shown in the position when the load is applied onto the press). The said slabs are placed into said mould until it is filled with 230 grams, which then are treated as explained in Example 5 with the following deviations: treated in press under a pressure of 52 metric tons, at 180° C., cooled to 20° C., treated in oven at 110° for 25 minutes.

*Example 10*

29 parts per weight polyvinylchloride, type Rhodopas XH, 29 parts per weight polyvinylchloride, type Rhodopas X, 6 parts per weight azo isobutyric dinitrile and 0.8 part per weight Ecarlate Vulcafix R, from Etablissements Francolor, 9, Avenue Georges V, Paris, all four extremely finely pulverized, 42 parts per weight dibutylphthalate, are mixed homogeneously in a mixer and of the resulting paste 234 grams are filled into the square mould as per Figs. 12, 13, 14, 15 of substantially same construction and design as the mould as per Figs. 5, 6, 10 and 11. In Figs. 12 to 15, $t$ is the body of the mould; $u$ is the cover made of soft aluminum sheet, fitting snugly over external dimensions of the mould and having grooves $x$ matching with mould grooves $w$ and obtained by pressing of cover onto the mould previous to its filling, thus forming a gas tight joint. $v$ is the contents of the mould.

The mould filled with the said 234 grams is thereafter covered with said preformed cover and further treated as explained in Example 3 with the following deviations: treated in press under pressure of 52 metric tons at a temperature of 180° C., cooled to 20° C., treated in oven at 110° C. for 35 minutes.

Wherever nothing to the contrary has been especially specified in the above explanations and examples, it is to be understood that all operations have to be carried out in such a way that the temperature of the mass, during treatment or storage, does not substantially raise above or fall below the normal temperature of about 25° C, unless otherwise specified. In the same way, the pressure is to be atmospheric pressure, unless otherwise specified.

With regard to the pressure applied to the hydraulic press before heating, it must be set at the degree indicated in each example, and must not at any moment fall below this degree during the heating and cooling of the press.

This will be obtained for instance by closing the press pumping opening, for example with a non-return valve. If, under these circumstances, the pressure, in the course of heating, happens to raise somewhat above the indicated degree, then it should be left along, but it should not be allowed to drop below the indicated degree until the heating and cooling cycle is over.

What I claim is:

1. Method for producing cellular thermoplastic materials having a polyhedral cell formation, comprising the steps of forming a mass from at least one thermoplastic material into a miniature model of a desired shape while minimizing the amount of air occluded in said mass, locating said model in a mold, placing said mold under pressure, heating the mass while under pressure to an incipient gelatinating temperature, distributing at least one inert gas throughout said mass in an extremely fine and uniform manner under pressure, suddenly reducing the pressure to a controlled but lower degree of super-atmospheric pressure to cause the system composed of the mass and occluded gas to swell, applying heat to further gelatinize the mass, cooling the mass to room temperature, reducing the pressure at atmospheric pressure, demolding the mass and allowing it to expand, heating said expanded mass to a plastic state under atmospheric pressure to further expand said mass, and finally cooling said expanding mass to ordinary temperatures.

2. In the method claimed in claim 1, the step of distributing a gas blowing agent in finely divided form uniformly throughout the initial thermoplastic material, whereby an inert gas is distributed throughout the mass on heat treatment thereof.

3. In the method claimed in claim 1, reducing the pressure, after the gas has been distributed throughout the mass, to allow the mass to expand, while still under pressure, to an extent of about 15% by volume.

4. In the method claimed in claim 1, the steps which consist in placing the preformed mass in a mold between the platens of a hydraulic press, applying a predetermined specific pressure to said mold by setting said press to a constant predetermined pressure to seal said mold in a gas-tight joint, and controlling said pressure by permitting automatic opening of said mold while in said press when said predetermined pressure is exceeded.

5. In the method claimed in claim 1, the steps of disposing the mold and its contents in an autoclave, filling said autoclave with gas under high pressure, heating the mass to incipient gelatinization temperature, and allowing sufficient time for thorough distribution and solution of said gas in the thermoplastic mass before reducing the pressure to allow the mass to expand.

6. In the method claimed in claim 5, introducing a gas blowing agent in said thermoplastic mass prior to placing it in the mold.

7. In the method claimed in claim 1, including as the thermoplastic material a composition comprising at least in part a member of the group consisting of polyvinyl formal, polyvinyl acetal and polyvinyl choride.

PASCAL J. CARPENTIER.

REFERENCES CITED

The following references are of record in the file of this patent:

UNITED STATES PATENTS

| Number | Name | Date |
|---|---|---|
| 869,311 | Leuchter | Oct. 29, 1907 |
| 2,186,881 | Parsons | Jan. 9, 1940 |
| 2,383,110 | Cooper | Aug. 21, 1945 |
| 2,405,345 | Cooper et al. | Aug. 6, 1946 |
| 2,442,940 | Staudinger et al. | June 8, 1948 |
| 2,484,397 | Barton | Oct. 11, 1949 |
| 2,525,880 | Feldman | Oct. 17, 1950 |
| 2,525,965 | Smith | Oct. 17, 1950 |

FOREIGN PATENTS

| Number | Country | Date |
|---|---|---|
| 500,298 | Great Britain | Feb. 7, 1939 |